(12) United States Patent
Mochizuki et al.

(10) Patent No.: US 7,574,561 B2
(45) Date of Patent: Aug. 11, 2009

(54) METHOD AND APPARATUS FOR STORING A DATA TO MEMORY DEVICES

(75) Inventors: Shinya Mochizuki, Kawasaki (JP);
Mikio Ito, Kawasaki (JP); Hidejiro Daikokuya, Kawasaki (JP); Kazuhiko Ikeuchi, Kawasaki (JP); Hideo Takahashi, Kawasaki (JP); Yoshihito Konta, Kawasaki (JP); Yasutake Satou, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 11/528,697

(22) Filed: Sep. 28, 2006

(65) Prior Publication Data

US 2007/0150652 A1 Jun. 28, 2007

(30) Foreign Application Priority Data

Dec. 28, 2005 (JP) ............................. 2005-376838

(51) Int. Cl.
*G06F 12/00* (2006.01)
(52) U.S. Cl. ................. 711/114; 711/156; 708/530; 708/531; 714/6; 714/52; 714/54
(58) Field of Classification Search ................. 711/114, 711/156; 708/530, 531; 714/6, 52, 54
See application file for complete search history.

(56) References Cited

U.S. PATENT DOCUMENTS

| 6,457,140 | B1 * | 9/2002 | Lindberg et al. ............... 714/6 |
| 7,127,557 | B2 * | 10/2006 | Ito et al. ...................... 711/114 |
| 7,370,148 | B2 * | 5/2008 | Ikeuchi et al. ............... 711/114 |
| 7,395,451 | B2 * | 7/2008 | Takahashi et al. .............. 714/5 |
| 7,433,999 | B2 * | 10/2008 | Mochizuki et al. .......... 711/114 |
| 2004/0133743 | A1 * | 7/2004 | Ito et al. ...................... 711/114 |

FOREIGN PATENT DOCUMENTS

| JP | 10-171608 | 6/1998 |
| JP | 2003-36146 | 2/2003 |

\* cited by examiner

*Primary Examiner*—Stephen C Elmore
(74) *Attorney, Agent, or Firm*—Staas & Halsey LLP

(57) ABSTRACT

A method and apparatus for enhancing performance of parity check in computer readable media is provided. For example, in a RAID (N+1) configuration, a virtual data strip is added for a calculation of parity. Data of the virtual data strip is set so that a predetermined portion of a data area in the virtual data strip has a predetermined value. Consequently, performance of parity check performed in a data processing system having a RAID configuration can be enhanced.

15 Claims, 11 Drawing Sheets

| disk | member | CRC | data |
|---|---|---|---|
| disk#0 | data0 | 0x00 | 0x00....0000000000 |
| disk#1 | data1 | 0x00 | 0x00....0000000000 |
| disk#2 | data2 | 0x00 | 0x00....0000000000 |
| phantom | phantom | 0xYY | 0x00....00ffffffff |
| disk#3 | parity | 0xYY | 0x00....00ffffffff |

Fig.3 identical copies of data are maintained on separate media.

| block ID | 0 | 1 | 2 | 3 | 4 | 5 |
|---|---|---|---|---|---|---|
| Data (hexadecimal) | 0 | 4 | 8 | 1 | f | 8 |
| Data (binary number representation) | 0000 | 0100 | 1000 | 0001 | 1111 | 1000 |

957, 956, 954

| | 940 | 939 | 938 | 937 |
|---|---|---|---|---|
| | Data Strip | Data Strip | Data Strip | Parity Strip |
| Block ID | 000 | 100 | 200 | 300 |
| | : | : | : | : |
| | 0ff | 1ff | 2ff | 3ff |

Fig.14

| | 935 | 934 | 933 | 932 |
|---|---|---|---|---|
| | Data Strip | Data Strip | Phantom block IDs | Parity Strip |
| Block ID | 000 | 100 | 000 | 100 |
| | : | : | : | : |
| | 0ff | 1ff | 0ff | 1ff |

Fig.15

METHOD AND APPARATUS FOR STORING A DATA TO MEMORY DEVICES

BACKGROUND OF THE INVENTION

1. Field of the Invention

The present invention relates to a method, an apparatus, and a program for enhancing performance of a parity check in computer-readable media, for example in RAID System.

2. Description of the Related Art

For data security, check codes are added to data on a block by block basis. A block serves as a unit of data input or output to/from a disk. A format of a block has a data area and a block check code (BCC). The BCC contains a block CRC which is obtained by a calculation based on the data, and a block ID (Identify) which is generated from a block address.

In FIG. 8, as a data storage disk configuration, RAID (Redundant Arrays of Inexpensive or Independent Disks) 1 or RAID 5 has been used. In a RAID 1 system, as shown in FIG. 8, identical data are stored on a disk 965 and a disk 964. FIG. 9A illustrates a RAID 4 or 5 system which includes a disk 963, a disk 962, and a disk 961 for storing data, and also includes a disk 960 for storing parity data. Hereinafter, the number of disks for storing data is referred to as "N", and, including a parity disk, the total number of disks is referred to as "(N+1)". An example of a RAID configuration shown in FIG. 9A is expressed as RAID (N+1), and in this example the value of "N" is "3".

FIG. 10 illustrates a relationship between block IDs and data stored on the disk. While block IDs 957 are updated sequentially, one at a time starting from 0, data 956 is stored in a location corresponding to a block ID 957 in hexadecimal digits 956 such as "0", "4", "8", "1", as shown in FIG. 10. The hexadecimal digits 956 can be expressed in binary 954 as shown below each of the hexadecimal digits 956 in the figure.

FIG. 11 illustrates a relationship between a strip 951, 9512, 9513 and a stripe 950. The stripe 950 has a plurality of strips 951, 9512, 9513. Addresses "00H" to "ffH" (H represents hexadecimal, hereinafter the same) designate data locations in a strip 951, and addresses "100H" to "1ffH" represent the next strip 9512. Such a plurality of strips constitutes a stripe 950.

In a RAID 4 or 5 system, the strips in the stripe 950 are provided with block IDs 957. The block IDs 957 have sequential values in the strip as shown in FIG. 11. For example, a block of data is stored in a location designated as the block ID 957 "00b" (b represents binary, hereinafter the same), and another block of data is stored in a location designated as the block ID 957 "01b". Likewise, other blocks of data are stored.

A BCC in a parity strip is generated by performing an exclusive OR (XOR) operation between BCCs (Block CRC and Block ID) in data strips. FIG. 12 illustrates a process for generating a parity strip. As illustrated in FIG. 12, an XOR operation is performed between each of the block IDs 957 on the strip 9512, 946, 945, and the resultant value is stored on the parity disk 944. A typical XOR operation is illustrated in FIG. 13. The block IDs on the strip 9431, strip 9432 and strip 9433 are "00b", "01b", and "10", respectively. The XOR operation is carried out in the manner described below.

First, the upper bit "0" of the block ID on the disk 0 and the upper bit "0" of the block ID on the strip 9432 are XORed. The resultant value is "0". Next, the lower bit "0" of the block ID on the strip 9431 and the lower bit "1" of the block ID on the disk 1 are XORed, and "1" is obtained. Thus, "01b" is obtained from these operations. Then, the obtained "01b" and "10b" of the block ID on the strip 9433 are XORed, resulting in "11b". This "11b" is stored on the parity strip 9434.

In a RAID "(N+1)" configuration, when "N" is an odd number, parity block IDs in a strip have sequential values. FIG. 14 illustrates a calculation process of parity block IDs when "N" is an odd number, "3" in this example. The first address "000H" on the strip 940 and the first address "100H" on the strip 939 are XORed, and "100H" is obtained. Then, this "100H" and the first address "200H" on the strip 938 are XORed, and "300H" is obtained.

This operation will be described in detail. The leading bits of the above block IDs are "1" and "2", respectively. Since "1"="0001b" and "2"="0010b", "0011b" is obtained by performing an XOR operation between these values. This resultant "0011b" is represented in hexadecimal as "3". When "00b" and "00b" are XORed, "00b" is obtained. Therefore, the first block ID on the parity strip 937 is "300H". Then an XOR operation is performed between the last block ID "0ffH" on the strip 940 and the last address "1ffH" on the strip 939 as shown in FIG. 14. The leading bits "0" and "1" are XORed, and the resultant "1" is obtained. Then, the remaining bits "ffH" and "ffH" are XORed, and the result is "00H". Therefore, the result of the XOR operation between "0ffH" and "1ffH" is "100H".

Then, this "100H" and the last block ID "2ffH" on the strip 938 are similarly XORed, and "3ffH" is obtained. Thus, as can be found from the above operation procedure, when "N" is an odd number, the block IDs in the parity strip 937 have sequential values starting from "300H" and ending with "3ffH".

On the other hand, when N is an even number, block IDs in a parity strip have constant values. For example, when "N"="2" in a RAID (N+1) system, the disk "0" 951 and the disk "1" 9512 as shown in FIG. 11 are provided and a parity disk 9513. The first block ID "000H" on the strip 951 and the first block ID "100H" on the strip 9512 are XORed, and "100H" is obtained. Then, an XOR operation is performed between the last block IDs "0ffH" on the strip 9512 and the last block IDs "1ffH" on the strip 9512, and thus "100H" is obtained. This "100H" is the same value obtained from the above XOR operation performed between the first block IDs. Therefore, it is found that the block IDs have constant values in a parity strip 9513 for RAID (N+1) when "N" is an even number.

However, since each block ID designates a location of data, the values of the block IDs in the parity strip have to be sequential. When "N" is an odd number, as described above, the parity strip block IDs have sequential values. On the other hand, however, when "N" is an even number, the values of the parity strip block IDs are the same regardless of the block ID values.

For this reason, when "N" is an even number, a virtual data IDs are prepared so that the XOR operations can be performed between even-number of block IDs. This virtual data IDs are referred to as a phantom block IDs. The phantom block ID is used to calculate the parity strip block ID. The parity strip block ID is not created by simple XOR operation when the disks are even number, because the simple XOR operation obtains the parity strip block ID which is not sequential in the parity strip.

A case where a phantom block ID is added to a RAID (N+1) system is illustrated in FIG. 15. In this case, the block IDs on the phantom block IDs are assumed to be "000H" to "0ffH". When the first block ID "000H" on the phantom block IDs and the first block ID "000H" on the strip 935 are XORed, "000H" is obtained. This obtained "000H" and the first block ID "100H" on the strip 934 are XORed, and "100H" is obtained.

Then, the last block ID "0ffH" on the phantom block IDs 933 and the last block ID "0ffH" on the strip 935 are XORed, and "000H" is obtained. The obtained "000H" and the last block ID "1ffH" on the strip 934 are XORed, and "1ffH" is obtained. This indicates the block IDs on the parity strip 932 have sequential values. Thus, even if "N" is an even number, providing a phantom block IDs causes block IDs to be sequential in a parity strip regardless of the value of "N" being even. In addition, by setting the 512-byte data area of each block in the phantom block IDs to be all "0s", the necessity for the XOR operation on data areas can be eliminated. This can keep an increase in operational cost for parity generation down to the amount for one additional XOR operation for 8-byte BCCs. For the phantom block CRC section in the 8-byte BCC, a value corresponding to the all "zero" of the 512-byte data is used. For a block ID section, a value such as a value of the leading strip in a stripe is used, for example.

Thus by using phantom block IDs, the values of block IDs in a parity strip are made sequential for an even number of member disks in a RAID configuration. This enables error detection for a parity strip to be performed similarly to that for a data strip.

As implementations of the foregoing operations, several techniques are known. When a logical failure occurs in a disk array apparatus, one of such techniques can be used to identify a magnetic disk drive that has caused the failure and where the error/failure that has not been detected in a data check process (CRC, parity) performed in units of magnetic disk drives (see, for example, Japanese Unexamined Patent Application Publication No. 1998-171608). Another known technique permits detection of a failure in which old data is erroneously read by a disk control unit with low error detection capability, and also permits detection of data errors using appended check codes (see, for example, Japanese Unexamined Patent Application Publication No. 2003-36146).

SUMMARY OF THE INVENTION

In a CRC calculation process, both the data and the BCC can be all "zero". Compared with other data/CRC combinations which are not all "zero", it can be considered that an all "zero" data/CRC combination results in degraded error correction precision, given that other units, such as a memory, are generally initialized with all "zero".

For example, for a data strip, a case can be assumed where a data/CRC combination produces "0" due to an initialization format. Alternatively, all of strips can have the same value. In this case, because an even number of XORs is to be performed for parity calculation by a phantom strip when an even number of member data disks is used in a RAID configuration, this can cause a data/CRC combination to produce "0", which degrades error detection performance. For example (without limitation), if the number of data disks is even in the RAID and the data is all "one," even with the use of a phantom strip in which the data is all "zero," the data/CRC combination produces all "0," which degrades, including prevent, error detection.

The present invention has been made in view of the above circumstance. Accordingly, there is a need for a method and a program for enhancing parity check performance in RAID with increased error detection precision.

According to the present invention, for example in a RAID, a virtual data strip is added for a calculation of parity when a number of disks "N" are an even number or an odd number, and data of this virtual data strip is set so that a predetermined portion of a data area in the virtual data strip has a predetermined value to increase or maintain error detection even if certain data (e.g., all zero) can degrade error detection.

According to the first aspect of the present invention, a method for enhancing parity check performance in a RAID system can be provided.

BRIEF DESCRIPTION OF THE DRAWINGS

FIG. 3 is a diagram illustrating a state in which a phantom block is used in FIG. 2, according to an embodiment of the present invention.

FIG. 14 illustrates a calculation procedure of a parity block ID, when N is an odd number.

FIG. 15 illustrates a case in which a phantom strip is added.

DESCRIPTION OF THE PREFERRED EMBODIMENTS

Figure 5:
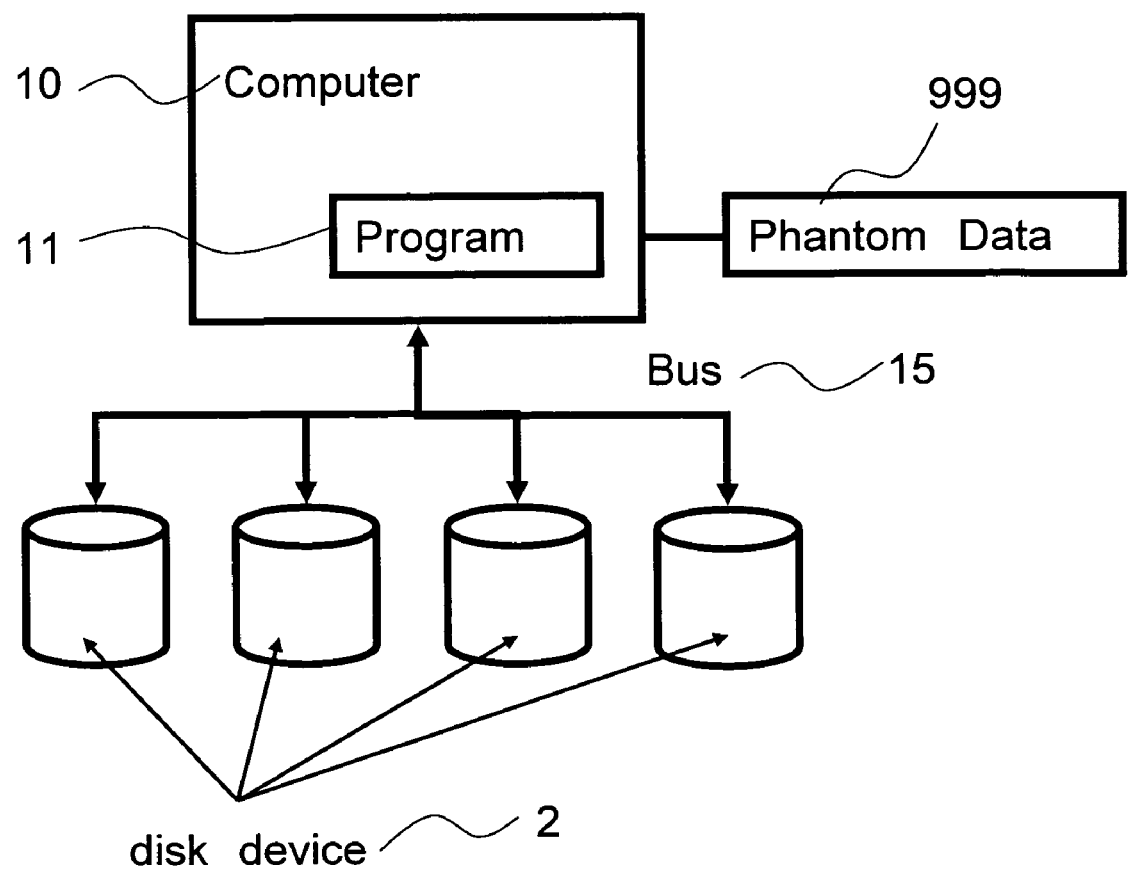
FIG. 5 illustrates an example of a system configuration for implementing an embodiment of the present invention.

FIG. 5 illustrates an example of a system configuration for implementing the present invention. A disk device 2 is a computer readable medium in which user data or parity data is stored. The computer readable medium can be applied which is non-volatile and randomly rewritable. The computer readable medium is, for example, a hard disk, non-volatile RAM, RAID, etc. A computer 10 performs control of reading/writing on the disk device 2. A program 11 is intended to be executed for operating the computer 10, according to the present invention. A bus 15 connects the computer 10 and the disk device 2. A phantom data 999 is stored in the computer 10. The computer 10 manages data using a plurality of the disk devices 2. In an embodiment, Redundant Array of Independent Disks (RAID) 5 is used as the disk devises 2.

The computer 10 includes a central processing unit (CPU), a random access memory (RAM), a read-only memory (ROM) and an input/output (I/O) interface 15 that communicably connects the disk devices 2 and computer 10. The central processing unit (CPU) as programmed functions as a calculator, a comparator and a storing and/or reading function according to the embodiments of the present invention. For example, the calculator obtains a parity calculation data based on parity calculation of data stored in the storage devices 2. The comparator determines whether said parity calculation data coincides with a predetermined value. The storage section storing function stores a predetermined data instead of said parity calculation data into one of said storage devices storing the parity data, when said parity calculation data coincides with said predetermined value. According to the aspect of the embodiments, the calculator, the comparator and the storing function are implemented in software and/or computer hardware to perform the embodiment processes described here.

In a RAID 5, a data disk device and a parity disk device are different disk devices under a predetermined condition. Disk devices which constitute RAID are referred to as member disk devices. For example, the data disk device is a disk device for storing user data. The parity disk device is a disk device for storing parity data created on the basis of the user data. Each disk device manages data in units of blocks.

Figure 6:
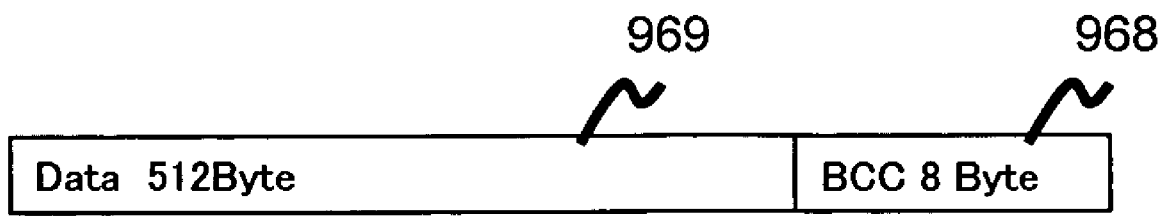
FIG. 6 illustrates an example of a format of a block of data, according to an embodiment of the present invention.

FIG. 6 is a diagram illustrating an example of a format of one block data, according to an embodiment of the present invention.

A block is a size of data for storing data in the disk device, and generally, the size is 520 bytes.

In the block, a data area 969 is 512 bytes and a BCC (block check code) area 968 is 8 bytes.

Figure 7:
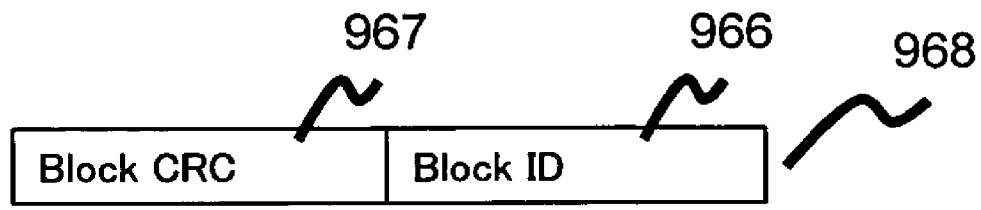
FIG. 7 illustrates an example of a BCC structure, according to an embodiment of the present invention.
Figure 8:
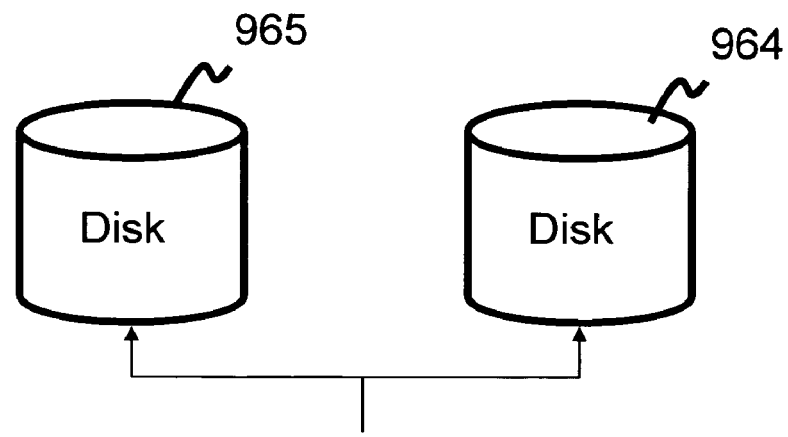
FIG. 8 illustrates RAID 1.

FIG. 7 illustrates an example of a structure of the BCC 968, according to an embodiment of the present invention. The BCC 968 includes a block CRC 967 and a block ID (Identify) 966. The block CRC 967 is obtained by a calculation based on the 512-byte data. The block ID 966 is an address in the disk.

The block ID is an identifier for identifying the block. The block ID is a number which is uniquely provided in each disk. Cyclic Redundancy Check (CRC) is a method for detecting an error in data. The block CRC 967 is a result CRC calculation performed on the data 969 in the block.

Subsequently, a data management method in a RAID 5 will be described. Each disk device stores a plurality of consecutive blocks at once.

Figure 9A:
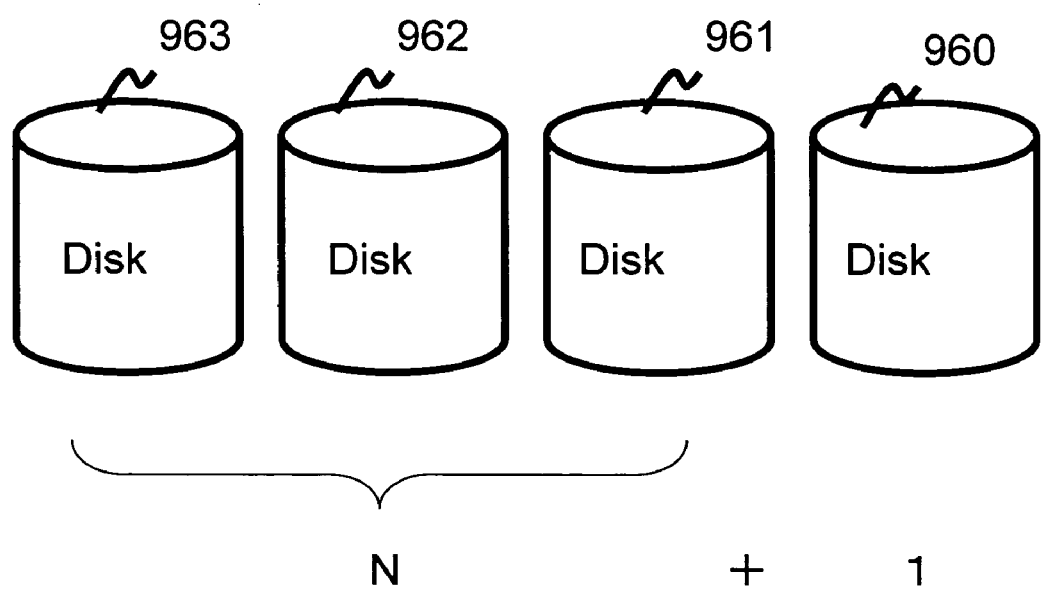
FIG. 9A illustrates RAID 5.
Figure 9B:
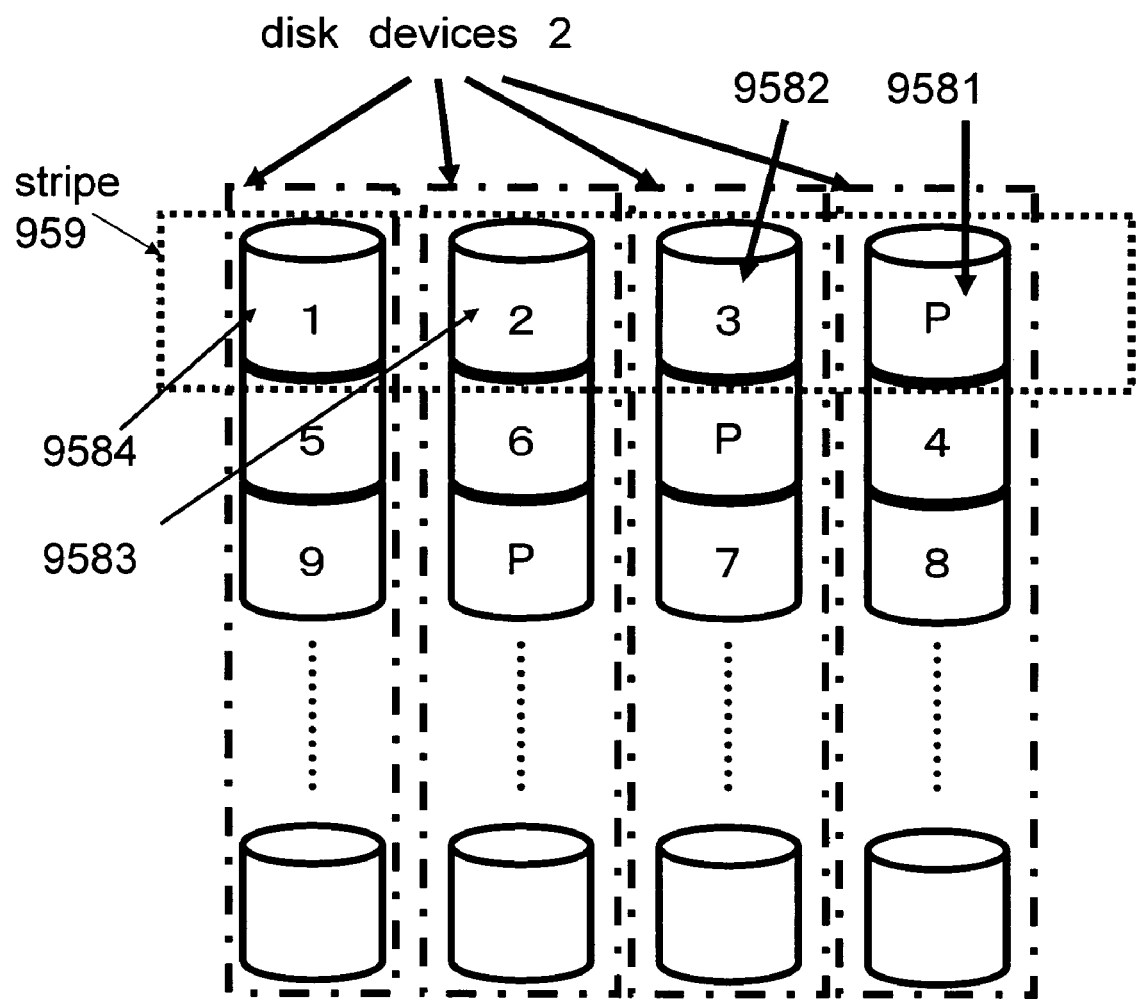
FIG. 9B illustrates a state in which a plurality of stripes in RAID 5 can be managed, according to an embodiment of the present invention.
Figures 10, 11:
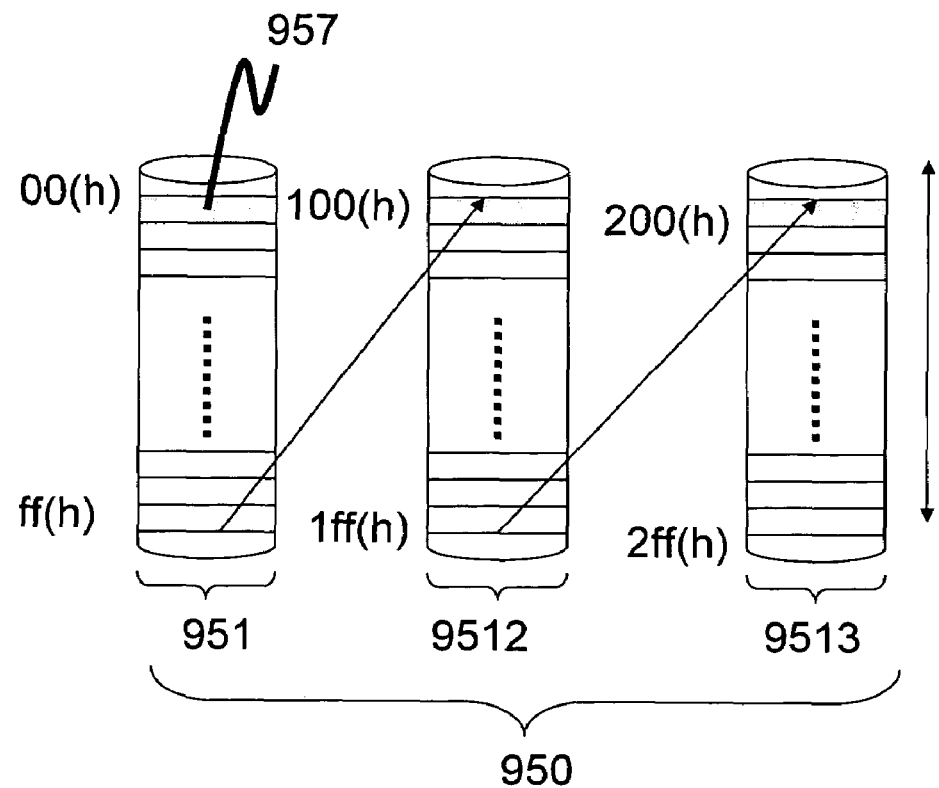
FIG. 10 illustrates a relationship between addresses and data.
FIG. 11 illustrates a relationship between a strip and a stripe.
Figure 12:
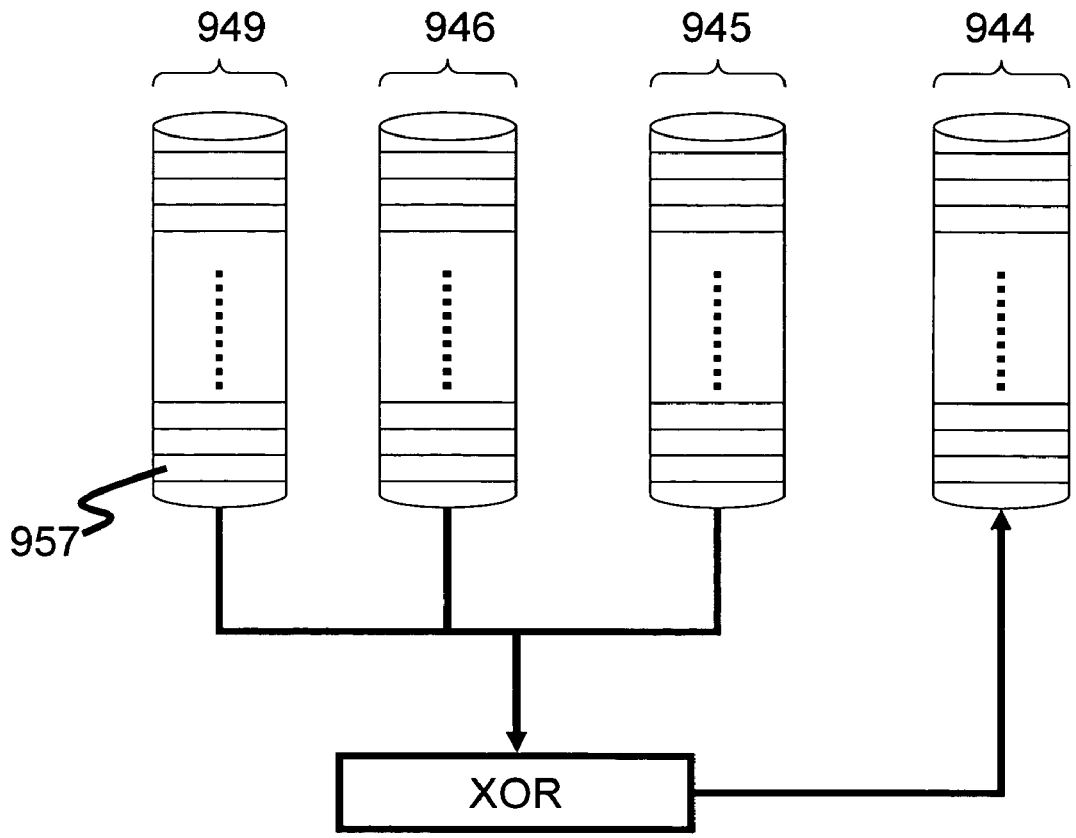
FIG. 12 illustrates a generation procedure of a parity strip.
Figure 13:
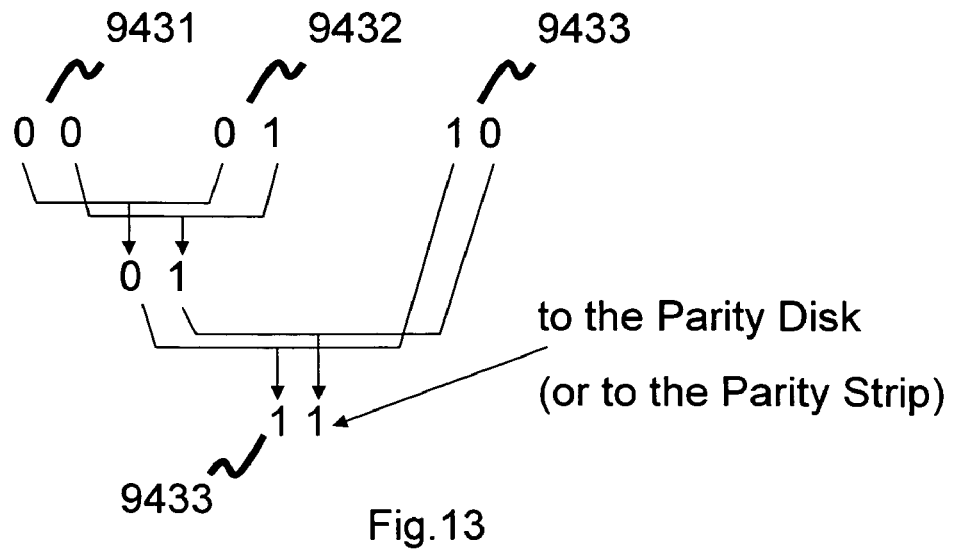
FIG. 13 illustrates an exclusive OR (XOR) operation.

FIG. 9B is a diagram illustrating a state in which a plurality of stripes in a RAID 5 is managed, according to an embodiment of the present invention. In RAID 5, disk devices 2 storing a data strip 9582, 9583 and 9584 and a disk device 2 storing a parity strip 9581 vary for each stripe 959. The stripe 959 is a unit which represents a group of strips 9581, 9582, 9583, 9584 in member disks constituting the RAID. In RAID 5, the disk devices 2 storing a data strip 9582, 9583 and 9584 which is different for each stripe 959 and the disk device 2 storing the parity strip 9581 which is different for each strip vary for each stripe as shown in FIG. 9B.

The parity block ID is created by an XOR (exclusive OR) of the block IDs. Block IDs of interest are block IDs which correspond to addresses in a sequential order in the stripe 959 of interest and in individual data strips 9582, 9583 and 9584.

When the parity data is created, a phantom data is used. The Phantom data is used for providing parity data which allows discriminatable data to be stored as the parity data if the number of member data disks 2 (N) is even. The phantom data can also include the data area 969 and the block CRC 967.

Figures 1, 2:
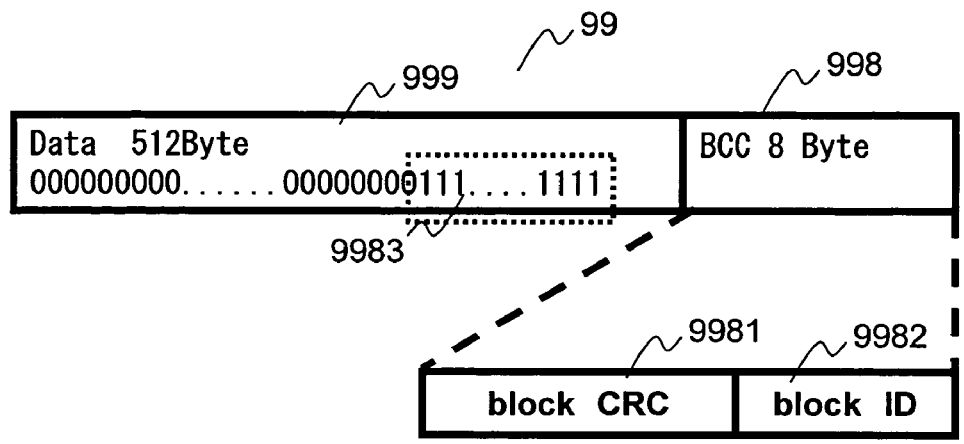
FIG. 1 illustrates a format of a phantom block, according to an embodiment of the present invention.
FIG. 2 illustrates a state of each disk device in a stripe, according to an embodiment of the present invention.

FIG. 1 is a diagram illustrating a format of a phantom block 99, according to an embodiment of the present invention. The phantom block 99 comprises the phantom data 999 and the phantom BCC 998. The phantom BCC 998 includes the phantom CRC 9981 and the phantom block ID 9982. In the phantom data 999, a specific portion in a data area is represented by "1b" in binary notation. A result of the CRC operation on the phantom data area 999 is the phantom CRC 9981. For example, FIG. 1, a portion of a lower value area in the phantom data area 9983 of the phantom data 999 is set to "1b" in binary notation.

The phantom block 99 is "520 bytes". In the phantom block 99, the phantom data 999 is "512 bytes" and the BCC 998 is "8 bytes".

As a result, even in a case where data for parity calculation is all "zero", a CRC calculation does not produce all "zero" since the phantom data, for example, the phantom data area 9983 is not all "zero".

Figure 16:
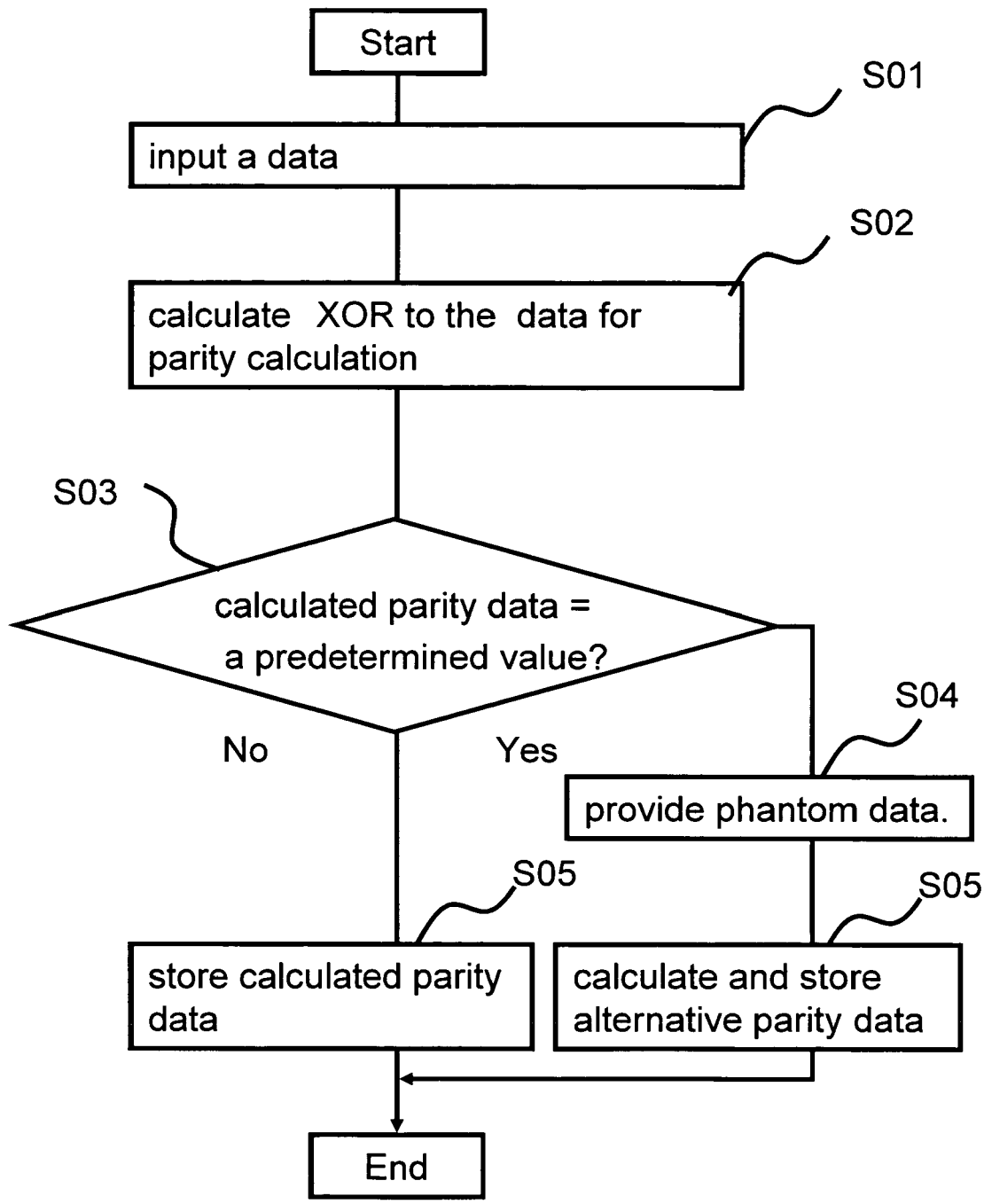
FIG. 16 is a flowchart for creating parity data, according to an embodiment of the present invention.

FIG. 16 is a flowchart for creating parity data when writing data to the RAID, according to an embodiment of the present invention. This flowchart illustrates a case where parity data is normally calculated. All data of interest, including phantom data, for creating parity data are acquired (S01). XOR operations are performed on the acquired data so that data for parity calculation is calculated (S02). It is determined whether the parity data from the parity calculation is equal to a predetermined value (S03).

The predetermined parity value (data/CRC combination) is such a parity value that does not allow an occurrence of a read error to be detected when parity data is read. In other words, the predetermined parity value is a parity value that causes a normal read even though a read error might have and/or has occurred, because, for example, a result value of the CRC operation is normal. For example, a calculated parity value of all zeros is generated when all the data 969 and the block CRC 967 is zero, and such a zero calculated parity value, including a zero parity CRC, can prevent and/or degrade detecting a read error since the parity data, including the parity CRC, is zero and deemed normal. Therefore, for example, the predetermined parity value can be all 0s or all 1s, or any other parity value(s) determinable to degrade read error(s) detection.

When the calculated parity data is same as the predetermined parity value (S03: Yes), phantom data is provided (in case of odd number of data disks where phantom data is not being used) or the phantom data is changed to another phantom data (in case of even number of data disks where phantom data is being used) (S04), for example, the phantom data 999 in FIG. 1.

Then, an XOR operation is performed between the data used for parity calculation and a provided or changed phantom data 999 so that another alternative parity data is calculated to be stored in a parity block for a parity strip (S05). If at S03, the calculated parity data does not equal the predetermined parity value, at S06, the calculated parity data is stored for a parity block of a parity strip. According to an aspect of the embodiments, the predetermined parity value is stored in a register or memory for comparison with the calculated parity data before storing the calculated parity data in a parity strip. According to an aspect of the embodiments, the predetermined value is settable either automatically based upon data storage system write/read conditions (e.g., during or for storage device initialization, etc.) and/or manually via system administrative functions by a user, thus providing dynamic parity data calculator and checker.

FIG. 2 is a diagram illustrating a state of each disk device 995 in a stripe 959, according to an embodiment of the present invention. The number of member disks is four. The individual disk devices 995 are named as "disk #0", "disk #1", "disk #2", and "disk #3". Functions of the individual disk devices 995 "disk #0", "disk #1", and "disk #2" as the members 994 are "data 0", "data 1", and "data 2", respectively. The "disk #3" is a parity disk. The "data 0", "the data 1", and "the data 2" are blocks in which user data is stored. A parity is a block in which parity data is stored. In the example shown in FIG. 2, a case is illustrated where both CRC areas 993 and data areas 992 are all "zero".

FIG. 3 is a diagram illustrating a state in which a phantom data is used in FIG. 2, according to an embodiment of the present invention. The individual disk devices 987 are named as "disk #0", "disk #1", "disk #2", and "disk #3". Functions of the individual disk devices 987 "disk #0", "disk #1", and "disk #2" as the members 986 are "data 0", "data 1", and "data 2", respectively. The "disk #3" is a parity disk. The CRC 985 and the data 984 of "disk #0", "disk #1" and "disk #2" are all "zero". In FIG. 3 a specific portion in the data area 984 of the phantom data 999 has a specific value. According to an aspect of the embodiments As a result, the phantom CRC 9981 to be obtained has also a specific value. The parity data 892 and parity CRC 891 is calculated from the user data and the phantom data 999.

When the phantom data 999 is used, the parity data 892 has a value which is not all "zero". Now, the information about using the phantom data 999 can be appended to the parity block. For example, the information can be appended to an area of the parity block ID so that phantom data 999 used for the parity data 892 can be recognized. According to an aspect of the embodiments, information indicating use of an alternative phantom data 999 is appended to the parity block, for example, the parity block ID, for purposes of proper or correct parity calculation and checking upon data reading.

Figure 4:
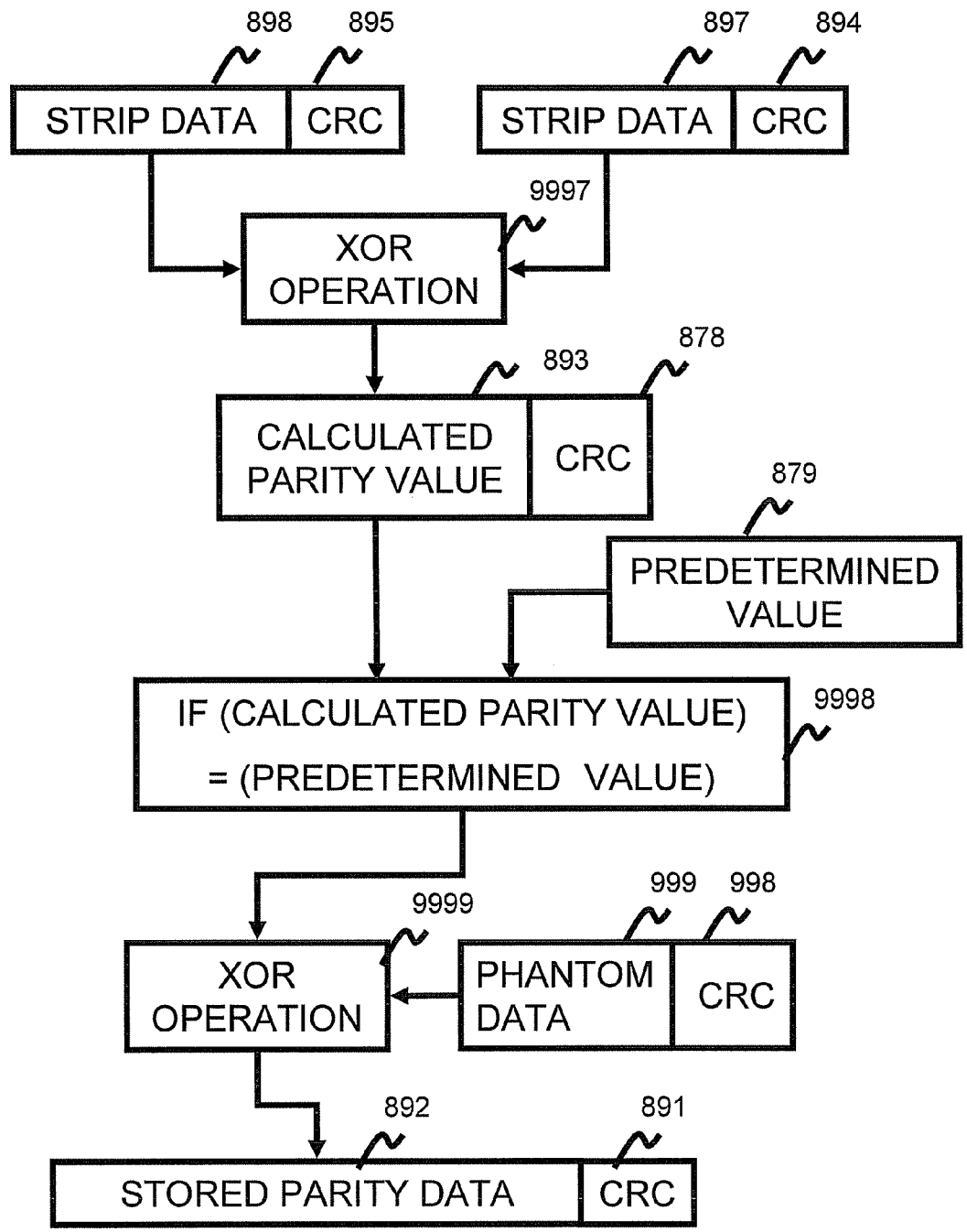
FIG. 4 is a diagram illustrating a calculation method according to an embodiment of the present invention.

FIG. 4 is a diagram illustrating a calculation method according to an embodiment the present invention. In an example shown in the FIG. 4, blocks include the phantom data 999, the data 898 and the data 897. Each of the phantom data 999, the data 898 and data 897 is composed of each of a CRC area 998, 895 and 894, respectively.

A parity calculating value 893 is calculated by performing the XOR operation 9997 between the data 898 and the data 897. If the parity calculating value 893 is equal to the predetermined value 879 in the operation 9998, the CPU executes the XOR operation 9999 between the parity calculating data 893 and the phantom data 999.

An area in the phantom data 999 has a specific data. In the present embodiment, the data area of the phantom data 999 is neither all "zero" nor all "1". The CPU obtains the parity data from the XOR operation 9999.

The CRC area 998 has a value obtained by the CRC operation on the data area of the phantom data 999. The CRC operation is also performed on the parity data area 892, and the result of the CRC operation is stored in the parity CRC area 891.

The CRC operation result of each data block is obtained so that a parity CRC data 891 is calculated for each data block.

The parity CRC calculation value 878 is calculated by performing an exclusive OR operation 9997 between the CRC area 895 of the data 998 and the CRC area 894 of the data 897.

If the parity calculating value 893 is equal to the predetermined value 879 in the operation 9998, the CPU also executes the XOR operation 9999 between the parity CRC calculation value 878 and the phantom CRC data 998 to obtain the stored parity CRC data 891.

Thus, according to the present invention, in a RAID storage configuration, a virtual data strip is provided. In data portions of the virtual strip, data which is neither all "zero" nor all "1" is set, so that a parity data portion which is not "zero" can be obtained by a calculation operation. This brings about an enhanced parity check operation.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of storing data and corresponding parity data in a plurality of storage devices, said data distributed into a plurality of data strips stored in said storage devices, respectively, the method comprising:
   calculating a parity data based on the data stored in said storage devices;
   determining whether said calculated parity data coincides with a predetermined value; and
   storing an alternative parity data instead of said calculated parity data into one of said storage devices storing the parity data, when said calculated parity data coincides with said predetermined value.

2. The method of according to claim 1, wherein the predetermined value is all 0s.

3. The method of according to claim 1, wherein the predetermined value is all 1s.

4. The method of according to claim 1, wherein at least one bit of the alternative parity data is "1".

5. An apparatus, comprising:
   a plurality of storage devices to store data and corresponding parity data, said data distributed among a plurality of data strips stored in said storage devices, respectively; and
   a processing unit to execute processes which include:
      calculating a parity data based on the data stored in said storage devices;
      determining whether said calculated parity data coincides with a predetermined value; and
      storing an alternative parity data instead of said calculated parity data into one of said storage devices storing the parity data, when said calculated parity data coincide with said predetermined value.

6. The apparatus according to claim 5, further comprising a settable register to store an initial value of the predetermined value.

7. The apparatus of according to claim 6, wherein the predetermined value is all 0s.

8. The apparatus of according to claim 6, wherein the predetermined value is all 1s.

9. The apparatus of according to claim 6, wherein at least one bit of the alternative parity data is 1.

10. The apparatus according to claim 5, further comprising a settable register storing a phantom data, and wherein the process of the processing unit further comprises:
    changing the phantom data to an alternative phantom data;
    calculating the alternative parity data based upon the data stored in the storage devices and the alternative phantom data; and
    storing the alternative parity data into the one of the storage devices storing the parity data.

11. The apparatus according to claim 10, wherein the alternative phantom data has a value other than all zeros or all ones.

12. The apparatus according to claim 11, wherein a data byte of the phantom data includes a plurality of 1s in series starting from a lowest bit of the data byte of the phantom data.

13. The apparatus according to claim 12, wherein the changing of the phantom data comprising appending information about the alternative phantom data to the alternative parity data.

14. The apparatus according to claim 13, wherein the data is a block of data comprising a data area portion, a cyclic redundancy check (CRC) portion and a block identifier portion, and a block identifier portion of the phantom data is used to calculate a block identifier portion of the parity data.

15. An apparatus, comprising:

a plurality of computer readable media to store data and corresponding parity data among a plurality of data strips stored in the computer readable media;

means for calculating the parity data based on the data to be stored in the computer readable media;

means for changing the calculated parity data to an alternative parity data if the calculated parity data is equal to a predetermined value; and means for storing and/or reading the data and the corresponding alternative parity data and/or the calculated parity data to and/from the computer readable media.

* * * * *

UNITED STATES PATENT AND TRADEMARK OFFICE
CERTIFICATE OF CORRECTION

| | | |
|---|---|---|
| PATENT NO. | : 7,574,561 B2 | Page 1 of 1 |
| APPLICATION NO. | : 11/528697 | |
| DATED | : August 11, 2009 | |
| INVENTOR(S) | : Shinya Mochizuki et al. | |

It is certified that error appears in the above-identified patent and that said Letters Patent is hereby corrected as shown below:

Column 8, Line 17, change "method of" to --method--.

Column 8, Line 19, change "method of" to --method--.

Column 8, Line 21, change "method of" to --method--.

Column 8, Line 40, change "apparatus of" to --apparatus--.

Column 8, Line 42, change "apparatus of" to --apparatus--.

Column 8, Line 44, change "apparatus of" to --apparatus--.

Signed and Sealed this

Third Day of November, 2009

David J. Kappos
*Director of the United States Patent and Trademark Office*